United States Patent
Lu et al.

(10) Patent No.: US 12,232,147 B2
(45) Date of Patent: Feb. 18, 2025

(54) FEEDBACK METHOD FOR SEMI-PERSISTENT SCHEDULING PHYSICAL DOWNLINK SHARED CHANNEL AND TERMINAL DEVICE

(71) Applicant: VIVO MOBILE COMMUNICATION CO., LTD., Guangdong (CN)

(72) Inventors: Zhi Lu, Guangdong (CN); Xueming Pan, Guangdong (CN); Xiaohang Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 342 days.

(21) Appl. No.: 17/671,865

(22) Filed: Feb. 15, 2022

(65) Prior Publication Data

US 2022/0174659 A1 Jun. 2, 2022

Related U.S. Application Data (63) Continuation of application No. PCT/CN2020/109216, filed on Aug. 14, 2020.

(30) Foreign Application Priority Data

Aug. 16, 2019 (CN) .......................... 201910760869.9

(51) Int. Cl.
*H04W 72/04* (2023.01)
*H04W 72/0446* (2023.01)
(Continued)

(52) U.S. Cl.
CPC ....... *H04W 72/51* (2023.01); *H04W 72/0446* (2013.01); *H04W 72/1273* (2013.01); *H04W 72/566* (2023.01)

(58) Field of Classification Search
CPC ............. H04W 72/51; H04W 72/0446; H04W 72/1273; H04W 72/566; H04W 72/23;
(Continued)

(56) References Cited

U.S. PATENT DOCUMENTS 9,332,533 B2 * 5/2016 Xu ........................ H04L 1/1896
11,025,372 B2 * 6/2021 Chen ..................... H04L 1/1896
(Continued)

FOREIGN PATENT DOCUMENTS

CN 102076103 A 5/2011
CN 109600212 A 4/2019
(Continued)

OTHER PUBLICATIONS

NTT Docomo, Inc., "Remaining issues on HARQ-ACK codebook and CA," 3GPP TSG RAN WG1 Meeting #92bis R1-1805059, Sanya China, Apr. 16-20, 2018 (8 pages).
(Continued)

*Primary Examiner* — Ahmed Elallam
(74) *Attorney, Agent, or Firm* — Price Heneveld LLP (57) ABSTRACT

Embodiments of the present disclosure provide a feedback method for a semi-persistent scheduling (SPS) physical downlink shared channel (PDSCH) and a terminal device, and relate to the field of communication technologies. The method includes: determining, when a plurality of SPS PDSCHs are configured in one slot, a feedback information codebook of the SPS PDSCHs according to a quantity of the SPS PDSCHs configured and a capability of the terminal device, where the capability of the terminal device is used for indicating a maximum quantity N of PDSCHs that the terminal device can decode in one slot.

20 Claims, 2 Drawing Sheets

Determine, when a plurality of SPS PDSCHs are configured in one slot, a feedback information codebook of the SPS PDSCHs according to a quantity of the SPS PDSCHs configured and a capability of a terminal device — S101

(51) Int. Cl.
*H04W 72/11* (2023.01)
*H04W 72/12* (2023.01)
*H04W 72/1273* (2023.01)
*H04W 72/51* (2023.01)
*H04W 72/566* (2023.01)
*H04L 5/00* (2006.01)

(58) Field of Classification Search
CPC ... H04L 1/1854; H04L 5/0044; H04L 5/0051; H04L 5/0055; H04L 5/0058; H04L 1/1829; H04L 1/1812
See application file for complete search history.

(56) References Cited

U.S. PATENT DOCUMENTS

| | | | |
|---|---|---|---|
| 11,503,587 B2* | 11/2022 | Khoshnevisan | H04W 72/23 |
| 11,722,205 B2* | 8/2023 | Sun | H04W 72/1263 370/329 |
| 11,870,584 B2* | 1/2024 | Park | H04L 1/1861 |
| 2014/0050176 A1 | 2/2014 | Lin et al. | |
| 2019/0081764 A1 | 3/2019 | Guan et al. | |
| 2019/0103947 A1 | 4/2019 | Park | |
| 2020/0344728 A1 | 10/2020 | Gao et al. | |
| 2021/0058196 A1 | 2/2021 | Chen et al. | |
| 2022/0053535 A1* | 2/2022 | Xu | H04W 72/23 |
| 2022/0159691 A1* | 5/2022 | Chen | H04L 1/1887 |
| 2022/0271873 A1* | 8/2022 | Gao | H04L 1/1854 |
| 2023/0291505 A1* | 9/2023 | Park | H04L 5/0096 |

FOREIGN PATENT DOCUMENTS

| | | | | |
|---|---|---|---|---|
| CN | 109802771 A | 5/2019 | | |
| CN | 110034862 A | 7/2019 | | |
| CN | 110034892 A | 7/2019 | | |
| CN | 110034902 A | 7/2019 | | |
| EP | 3944699 A1 * | 1/2022 | ......... | H04L 1/1822 |
| WO | 2012146107 A1 | 11/2012 | | |
| WO | 2017160350 A1 | 9/2017 | | |
| WO | 2017193277 A1 | 11/2017 | | |
| WO | 2018232368 A1 | 12/2018 | | |

OTHER PUBLICATIONS

Nokia, Nokia Shanghai Bell, "Support for SPS periodicities below a slot," 3GPP TSG RAN WG1 Meeting #97 R1-1906758, Reno NV USA, May 13-17, 2019 (9 pages).

Samsung, "Discussion on DL SPS", 3GPP TSG RAN WG1 #97, R1-1906961, Reno, USA, May 13-17, 2019.

Spreadtrum Communications, "Discussion on UCI enhancements for URLLC", 3GPP TSG RAN WG1 #97, R1-1906358, Reno, USA, May 13-17, 2019.

Catt, "Discussion on DL SPS overlapping", 3GPP TSG RAN WG1 Meeting #97, R1-1906335, Reno, USA, May 13-17, 2019.

Ericsson, "Support for Shorter DL SPS Periodicities", 3GPP TSG RAN WG1 Meeting #97, R1-1906101, Reno, Nevada, USA, May 13-17, 2019.

Samsung, "On enhancements to scheduling/HARQ for eURLLC", 3GPP TSG RAN WG1 #96bis, R1-1904443, Xi'an, China, Apr. 8-12, 2019.

Nokia, "Summary of contributions on UL/DL intra-UE prioritization/multiplexing", 3GPP TSG-RAN WG1 #96, R1-1903369, Athens, Greece, Feb. 25-Mar. 1, 2019.

* cited by examiner

Determine, when a plurality of SPS PDSCHs are configured in one slot, a feedback information codebook of the SPS PDSCHs according to a quantity of the SPS PDSCHs configured and a capability of a terminal device  ~ S101

FEEDBACK METHOD FOR SEMI-PERSISTENT SCHEDULING PHYSICAL DOWNLINK SHARED CHANNEL AND TERMINAL DEVICE

CROSS-REFERENCE TO RELATED APPLICATIONS

The present application is a bypass continuation application of International Application No. PCT/CN2020/109216 filed on Aug. 14, 2020, which claims priority to Chinese Patent Application No. 201910760869.9, filed on Aug. 16, 2019, which are incorporated herein by reference in their entireties.

TECHNICAL FIELD

Embodiments of the present disclosure relate to the field of communications technologies, and in particular, to a feedback method for a semi-persistent scheduling physical downlink shared channel and a terminal device.

BACKGROUND

With the continuous development of communications technologies, mobile communications systems need to adapt to more diversified services and scenarios. Such services and scenarios require high reliability, low latency, large bandwidth, wide coverage, and the like for the mobile communications systems.

For example, to meet low latency and high reliability required by ultra-reliable and low-latency communications (URLLC) services, a terminal device that can support a plurality of services may have a plurality of semi-persistent scheduling (SPS) physical downlink shared channels (PDSCHs) and configurations thereof in one slot. Therefore, a feedback method for an SPS PDSCH is urgently needed.

SUMMARY

Embodiments of the present disclosure provide a feedback method for a semi-persistent scheduling physical downlink shared channel (SPS PDSCH) and a terminal device.

In a first aspect, an embodiment of the present disclosure provides a feedback method for an SPS PDSCH, where the method is applicable to a terminal device and the method includes: determining, when a plurality of SPS PDSCHs are configured in one slot, a feedback information codebook of the SPS PDSCHs according to a quantity of the SPS PDSCHs configured and a capability of the terminal device, where the capability of the terminal device is used for indicating a maximum quantity N of PDSCHs that the terminal device can decode in one slot.

In a second aspect, an embodiment of the present disclosure provides a terminal device, including: a processing module, configured to determine, when a plurality of SPS PDSCHs are configured in one slot, a feedback information codebook of the SPS PDSCHs according to a quantity of the SPS PDSCHs configured and a capability of the terminal device, where the capability of the terminal device is used for indicating a maximum quantity N of PDSCHs that the terminal device can decode in one slot.

In a third aspect, an embodiment of the present disclosure provides a terminal device, including a processor, a memory, and a computer program stored on the memory and executable on the processor, where the computer program, when executed by the processor, implements the steps of the feedback method for an SPS PDSCH according to the technical solution in the first aspect.

In a fourth aspect, an embodiment of the present disclosure provides a computer-readable storage medium, storing a computer program, where the computer program, when executed by a processor, implements the steps of the feedback method for an SPS PDSCH according to the technical solution in the first aspect.

BRIEF DESCRIPTION OF THE DRAWINGS

Specific implementations of the present disclosure are described below with reference to the accompanying drawings to better understand the present disclosure. The same or similar reference numerals represent same or similar features.

DETAILED DESCRIPTION

The following clearly describes the technical solutions in the embodiments of the present disclosure with reference to the accompanying drawings in the embodiments of the present disclosure. Apparently, the described embodiments are some embodiments of the present disclosure rather than all of the embodiments. All other embodiments obtained by a person of ordinary skill in the art based on the embodiments of the present disclosure fall within the protection scope of the present disclosure.

The embodiments of the present disclosure provide a feedback method for a semi-persistent scheduling physical downlink shared channel (SPS PDSCH), a terminal device, and a storage medium, which may be applied to a scenario in which feedback is performed when there are a plurality of SPS PDSCHs in one slot. A plurality of SPS PDSCHs may be configured in one slot, and a feedback information codebook may be constructed for the plurality of SPS PDSCHs, to implement encoding and feedback of the plurality of SPS PDSCHs. In the embodiments of the present disclosure, the terminal device may be specifically user equipment (UE) or the like. This is not limited herein.

Figure 1:
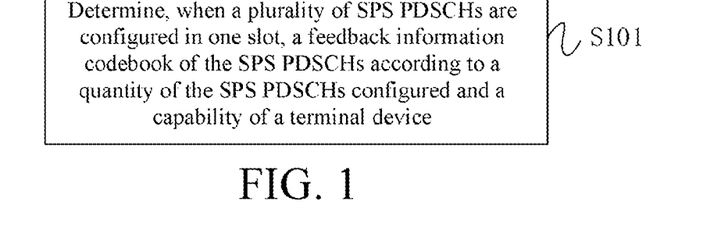
FIG. 1 is a flowchart of an embodiment of a feedback method for an SPS PDSCH according to a first aspect of the present disclosure.

FIG. 1 is a flowchart of an embodiment of a feedback method for an SPS PDSCH according to a first aspect of the present disclosure. The feedback method for an SPS PDSCH is applicable to the terminal device. As shown in FIG. 1, the feedback method for an SPS PDSCH may include step S101.

Step S101. Determine, when a plurality of SPS PDSCHs are configured in one slot, a feedback information codebook of the SPS PDSCHs according to a quantity of the SPS PDSCHs configured and a capability of a terminal device.

Figure 2:
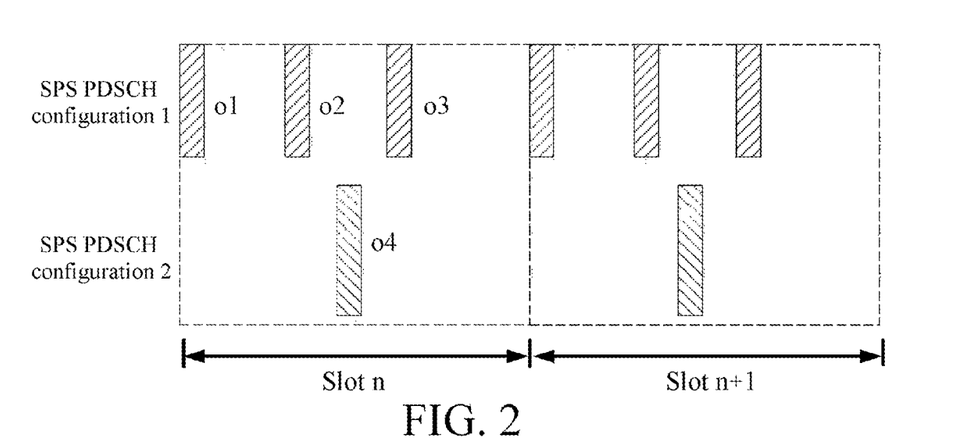
FIG. 2 is a schematic diagram of an example of SPS PDSCHs according to an embodiment of the present disclosure.

There may be a plurality of different SPS PDSCH configurations, and periods and lengths of SPS PDSCHs in each configuration may be different. Therefore, a quantity of SPS PDSCHs of the configurations in one slot may be the same or may be different. A total quantity of SPS PDSCHs in all the SPS PDSCH configurations configured in one slot is obtained herein. For example, FIG. 2 is a schematic diagram of an example of SPS PDSCHs according to an embodiment of the present disclosure. Two slots are shown in FIG. 2, which are respectively a slot n and a slot n+1. The SPS PDSCH configurations include an SPS PDSCH configuration 1 and an SPS PDSCH configuration 2. There are three SPS PDSCHs configured as the SPS PDSCH configuration 1 and one SPS PDSCH configured as the SPS PDSCH configuration 2 in each of the slot n and the slot n+1. That is, the slot n has four SPS PDSCHs, and the slot n+1 has four SPS PDSCHs.

For ease of description, in this embodiment of the present disclosure, the feedback method for an SPS PDSCH is described by using one slot. The feedback method for an SPS PDSCH in each slot is consistent with the feedback method for an SPS PDSCH in the slot.

A capability of the terminal device is used for indicating a maximum quantity N of PDSCHs that the terminal device can decode in one slot and representing a decoding capability of the terminal device. Specifically, the terminal device can decode a plurality of PDSCHs in one slot, or the terminal device can decode only one PDSCH in one slot. The PDSCH may include a dynamic scheduling PDSCH and/or an SPS PDSCH. In this embodiment of the present disclosure, there is no dynamic scheduling PDSCH in one slot.

A feedback information codebook includes feedback bit information of the SPS PDSCHs. The feedback bit information may specifically include hybrid automatic repeat request-acknowledgment (HARQ-ACK) bit information, that is, acknowledgement (ACK) bit information and/or non-acknowledgement (NACK) bit information. The feedback information codebook may be constructed by using the feedback bit information.

Feedback bit information of SPS PDSCHs that can be supported by the terminal device and used for constructing a feedback information codebook may be determined according to the SPS PDSCHs in one slot and a capability of the terminal device, so that the feedback information codebook is constructed by using the feedback bit information of the SPS PDSCHs.

In some embodiments, the maximum quantity N of PDSCHs that the terminal device can decode in one slot is greater than 1. For example, N=5, that is, the terminal device can decode a maximum of five PDSCHs in one slot. If a quantity of SPS PDSCHs in one slot is greater than or equal to N, feedback bit information of the SPS PDSCHs in a feedback information codebook is determined according to the capability of the terminal device. SPS PDSCH configurations may be the same or may be different.

Specifically, a quantity of pieces of feedback bit information of the SPS PDSCHs in the feedback information codebook should be less than or equal to N. That is, SPS PDSCHs of which a quantity is less than or equal to N are selected from the SPS PDSCHs in the slot, and the feedback information codebook is constructed by using the feedback bit information of the selected SPS PDSCHs. The selection manner may be predefined. For example, selection is performed according to a time domain sequence, that is, according to a sequence of start symbols of the configured SPS PDSCHs. In another example, priorities may alternatively be preset for SPS PDSCH configurations, and selection is performed in descending order of the priorities.

Six examples are taken below to illustrate how to determine the feedback bit information of the SPS PDSCHs in the feedback information codebook according to the capability of the terminal device when the quantity of SPS PDSCHs in the slot is greater than or equal to N, to construct the feedback information codebook. It should be noted that, the manner of constructing the feedback information codebook is not limited to manners in the six examples below.

In a first example, SPS PDSCH configurations are configured with priorities. When SPS PDSCHs in one slot do not overlap in time domain, feedback bit information of N SPS PDSCHs may be selected in descending order of the priorities of the SPS PDSCH configurations, to construct the feedback information codebook.

For example, the slot n shown in FIG. 2 corresponds to four SPS PDSCHs, which are respectively o1, o2, o3, and o4. The SPS PDSCH configuration 1 corresponds to o1, o2, and o3, and the SPS PDSCH configuration 2 corresponds to o4. It is assumed that N=3, and a priority of the SPS PDSCH configuration 1 is higher than a priority of the SPS PDSCH configuration 2. The three SPS PDSCHs o1, o2, and o3 may be selected from the four SPS PDSCHs corresponding to the slot n, to obtain feedback bit information of the three selected SPS PDSCHs, which may be specifically HARQ-ACK bits of the three SPS PDSCHs, and a feedback information codebook is constructed by using the feedback bit information of the three SPS PDSCHs.

In a second example, SPS PDSCH configurations are configured with priorities. When SPS PDSCHs in one slot do not overlap in time domain, it is detected whether the SPS PDSCH configurations correspond to SPS PDSCH transmission, and feedback bit information of N detected SPS PDSCHs is selected in descending order of the priorities of the SPS PDSCH configurations, to construct the feedback information codebook.

A difference between the second example and the first example is that each PDSCH location (that is, occasion) in the SPS PDSCH configurations may correspond to SPS PDSCH transmission or may correspond to no SPS PDSCH transmission. Therefore, it may be first detected whether the SPS PDSCH configurations correspond to the SPS PDSCH transmission. If it is detected that the SPS PDSCH configurations correspond to the SPS PDSCH transmission, the feedback bit information of the N SPS PDSCHs is selected from the detected SPS PDSCHs, to construct the feedback information codebook.

In a third example, SPS PDSCH configurations are configured with priorities. When a plurality of SPS PDSCHs in one slot at least partially overlap in time domain, N SPS PDSCHs may be selected in descending order of the priorities of the SPS PDSCH configurations, and if at least two SPS PDSCHs of the selected SPS PDSCHs at least partially overlap in time domain, feedback bit information of the SPS PDSCH of which a configuration is configured with a higher priority in the at least two SPS PDSCHs and feedback bit information of the SPS PDSCHs that do not overlap in time domain are selected to construct the feedback information codebook.

Figure 3:
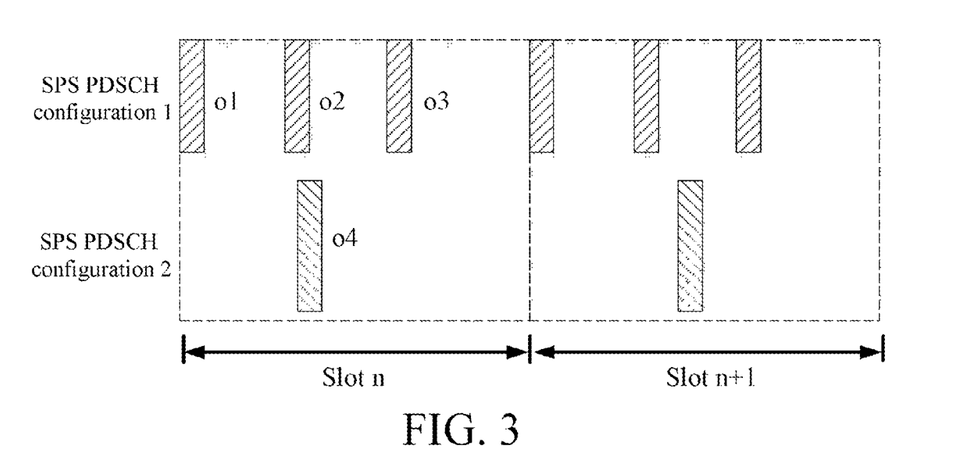
FIG. 3 is a schematic diagram of another example of SPS PDSCHs according to an embodiment of the present disclosure.

For example, FIG. 3 is a schematic diagram of another example of SPS PDSCHs according to an embodiment of the present disclosure. As shown in FIG. 3, a slot n corresponds to four SPS PDSCHs, which are respectively o1, o2, o3, and o4. SPS PDSCH configurations include an SPS PDSCH configuration 1 and an SPS PDSCH configuration 2. The SPS PDSCH configuration 1 corresponds to o1, o2, and o3, the SPS PDSCH configuration 2 corresponds to o4, and o2 and o4 at least partially overlap in time domain. It is assumed that N=4, and a priority of the SPS PDSCH configuration 1 is higher than a priority of the SPS PDSCH configuration 2. In the slot n, decoding of o4 corresponding to the SPS PDSCH configuration 2 may be discarded. Feedback bit information of the three SPS PDSCHs o1, o2, and o3 is obtained, which is specifically HARQ-ACK bits of the three SPS PDSCHs, and a feedback information codebook is constructed by using the feedback bit information of the three SPS PDSCHs.

In a fourth example, SPS PDSCH configurations are configured with priorities. When a plurality of SPS PDSCHs in one slot at least partially overlap in time domain, it is detected whether the SPS PDSCH configurations correspond to SPS PDSCH transmission. N detected SPS PDSCHs are selected in descending order of the priorities of the SPS PDSCH configurations. If at least two SPS PDSCHs of the selected detected SPS PDSCHs at least partially overlap in time domain, feedback bit information of the SPS PDSCH of which a configuration is configured with a higher priority in the at least two SPS PDSCHs and feedback bit information of the detected SPS PDSCHs that do not overlap in time domain are selected, to construct the feedback information codebook.

A difference between the fourth example and the third example is that each PDSCH location (that is, occasion) in the SPS PDSCH configurations may correspond to SPS PDSCH transmission or may correspond to no SPS PDSCH transmission. Therefore, it may be first detected whether the SPS PDSCH configurations correspond to the SPS PDSCH transmission. The feedback bit information of the SPS PDSCHs is selected by using the detected SPS PDSCHs and the feedback information codebook is constructed.

In a fifth example, SPS PDSCH configurations are configured with priorities. When a plurality of SPS PDSCHs in one slot at least partially overlap in time domain, N SPS PDSCHs are selected in descending order of the priorities of the SPS PDSCH configurations, and if at least two SPS PDSCHs of the selected SPS PDSCHs at least partially overlap in time domain, the feedback information codebook is constructed by using feedback bit information of the N selected SPS PDSCHs.

That is, the feedback information codebook is constructed by using the feedback bit information of the SPS PDSCHs that at least partially overlap in time domain and the feedback bit information of the SPS PDSCHs that do not overlap in time domain.

In a sixth example, SPS PDSCH configurations are configured with priorities. When a plurality of SPS PDSCHs in one slot at least partially overlap in time domain, it is detected whether the SPS PDSCH configurations correspond to SPS PDSCH transmission. N detected SPS PDSCHs are selected in descending order of the priorities of the SPS PDSCH configurations. If at least two SPS PDSCHs of the selected detected SPS PDSCHs at least partially overlap in time domain, the feedback information codebook is constructed by using feedback bit information of the N selected detected SPS PDSCHs.

A difference between the sixth example and the fifth example is that each PDSCH location (that is, occasion) in the SPS PDSCH configurations may correspond to SPS PDSCH transmission or may correspond to no SPS PDSCH transmission. Therefore, it may be first detected whether the SPS PDSCH configurations correspond to the SPS PDSCH transmission. The feedback bit information of the SPS PDSCHs is selected by using the detected SPS PDSCHs and the feedback information codebook is constructed.

It should be noted that, the setting of the priority may be determined according to a priority factor. The priority factor may include configuration identifiers (that is, ID) of the SPS PDSCH configurations, periods of the SPS PDSCH configurations, durations of the SPS PDSCH configurations, or the like, or the priority is configured by using an RRC signaling. This is not limited herein.

For example, a priority of an SPS PDSCH configuration with a large configuration ID is higher than a priority of an SPS PDSCH configuration with a small configuration ID.

In another example, a priority of an SPS PDSCH configuration with a long period is lower than a priority of an SPS PDSCH configuration with a short period.

In still another example, a priority of an SPS PDSCH configuration with a short duration is higher than a priority of an SPS PDSCH configuration with a long duration.

A manner of determining the feedback bit information of the SPS PDSCHs in the feedback information codebook according to the quantity of SPS PDSCHs when the quantity of SPS PDSCHs in the slot is less than N, to construct the feedback information codebook is described below by using six examples. It should be noted that, the manner of constructing the feedback information codebook is not limited to manners in the six examples below.

In a first example, when SPS PDSCHs in one slot do not overlap in time domain, the feedback information codebook may be constructed by using feedback bit information of feedback information of all the SPS PDSCHs.

For example, the slot n shown in FIG. 2 corresponds to four SPS PDSCHs, which are respectively o1, o2, o3, and o4. The SPS PDSCH configuration 1 corresponds to o1, o2, and o3, and the SPS PDSCH configuration 2 corresponds to o4. It is assumed that N=5, and a feedback information codebook may be constructed by using feedback bit information of the four SPS PDSCHs o1, o2, o3, and o4, which is specifically HARQ-ACK bits of the four SPS PDSCHs.

In a second example, when SPS PDSCHs in one slot do not overlap in time domain, it may be detected whether SPS PDSCH configurations correspond to SPS PDSCH transmission, and the feedback information codebook is constructed by using feedback bit information of the detected SPS PDSCHs.

A difference between the second example and the first example is that each PDSCH location (that is, occasion) in the SPS PDSCH configurations may correspond to SPS PDSCH transmission or may correspond to no SPS PDSCH transmission. Therefore, it may be first detected whether the SPS PDSCH configurations correspond to the SPS PDSCH transmission. The feedback information codebook is constructed by using the feedback bit information of the detected SPS PDSCHs.

In a third example, SPS PDSCH configurations are configured with priorities. When a plurality of SPS PDSCHs in one slot at least partially overlap in time domain, feedback bit information of SPS PDSCHs of which configurations are configured with higher priorities in the plurality of SPS PDSCHs that at least partially overlap in time domain and feedback bit information of the SPS PDSCHs that do not overlap in time domain are selected, to construct the feedback information codebook.

For example, the slot n shown in FIG. 3 corresponds to four SPS PDSCHs, which are respectively o1, o2, o3, and o4. The SPS PDSCH configuration 1 corresponds to o1, o2, and o3, and the SPS PDSCH configuration 2 corresponds to o4. o2 and o4 at least partially overlap in time domain. It is assumed that N=5, and a priority of the SPS PDSCH configuration 1 is higher than a priority of the SPS PDSCH configuration 2. Decoding of o4 may be discarded, and a feedback information codebook is constructed by using feedback bit information of the three SPS PDSCHs o1, o2, and o3, which is specifically HARQ-ACK bits of the three SPS PDSCHs.

In a fourth example, SPS PDSCH configurations are configured with priorities. When a plurality of SPS PDSCHs in one slot at least partially overlap in time domain, it may be detected whether the SPS PDSCH configurations correspond to SPS PDSCH transmission, and feedback bit information of SPS PDSCHs of which configurations are configured with higher priorities in a plurality of detected SPS PDSCHs that at least partially overlap in time domain and feedback bit information of the detected SPS PDSCHs that do not overlap in time domain are selected, to construct the feedback information codebook.

A difference between the fourth example and the third example is that each PDSCH location (that is, occasion) in the SPS PDSCH configurations may correspond to SPS PDSCH transmission or may correspond to no SPS PDSCH transmission. Therefore, it may be first detected whether the SPS PDSCH configurations correspond to the SPS PDSCH transmission. The feedback information codebook is constructed by using the feedback bit information of the detected SPS PDSCHs.

In a fifth example, SPS PDSCH configurations are configured with priorities. When a plurality of SPS PDSCHs in one slot at least partially overlap in time domain, the feedback information codebook may be constructed by using feedback bit information of all the SPS PDSCHs.

That is, the feedback information codebook is constructed by using the feedback bit information of the SPS PDSCHs that at least partially overlap in time domain and the feedback bit information of the SPS PDSCHs that do not overlap in time domain.

In a sixth example, SPS PDSCH configurations are configured with priorities. When a plurality of SPS PDSCHs in one slot at least partially overlap in time domain, it may be detected whether the SPS PDSCH configurations correspond to SPS PDSCH transmission. The feedback information codebook is constructed by using feedback bit information of all the detected SPS PDSCHs.

A difference between the sixth example and the fifth example is that each PDSCH location (that is, occasion) in the SPS PDSCH configurations may correspond to SPS PDSCH transmission or may correspond to no SPS PDSCH transmission. Therefore, it may be first detected whether the SPS PDSCH configurations correspond to the SPS PDSCH transmission. The feedback information codebook is constructed by using the feedback bit information of the detected SPS PDSCHs.

For content of a high priority and a low priority, reference may be made to the related description in the foregoing embodiment. Details are not described herein again.

For a method for determining the feedback bit information of the SPS PDSCHs that do not overplay in time domain, the feedback bit information of all the SPS PDSCHs may be fed back, or only the feedback bit information of the detected SPS PDSCHs may be fed back.

When a feedback information codebook of one slot is constructed, for the method for determining feedback bit information of SPS PDSCHs that at least partially overlap in time domain, the method for determining feedback bit information of SPS PDSCHs that do not overlap in time domain, another combination manner between the two also falls within the protection scope of the embodiments of the present disclosure.

In the foregoing embodiment, the terminal device may detect whether all the SPS PDSCH configurations correspond to the SPS PDSCH transmission based on a demodulation reference signal (DMRS). Alternatively, the terminal device detects whether the SPS PDSCH configurations with higher priorities correspond to the SPS PDSCH transmission based on a DMRS. For example, energy detection is performed according to a DMRS sequence. If detected energy exceeds a threshold, it is considered that there is corresponding SPS PDSCH transmission; otherwise, it is considered that there is no corresponding SPS PDSCH transmission.

In the foregoing embodiment, the terminal device decodes the SPS PDSCHs. If the decoding is correct, the feedback bit information is ACK bits; and if the decoding is error, the feedback bit information is NACK bits.

In some other embodiments, the maximum quantity N of PDSCHs that the terminal device can decode in one slot is equal to 1. SPS PDSCH configurations are configured with priorities. The terminal device may sequentially detect whether the SPS PDSCH configurations correspond to SPS PDSCH transmission in descending order of the priorities of the SPS PDSCH configurations until the SPS PDSCH configurations correspond to the SPS PDSCH transmission, and select feedback bit information of SPS PDSCHs corresponding to the SPS PDSCH configurations, to construct the feedback information codebook. If no SPS PDSCH configurations correspond to the SPS PDSCH transmission, the feedback information codebook is constructed by using NACK feedback bit information.

For example, the terminal device may first detect time-domain locations of SPS PDSCHs corresponding to all SPS PDSCH configurations in one slot without decoding all the SPS PDSCHs. It is preferably detected whether SPS PDSCH configurations with higher priorities correspond to the SPS PDSCH transmission. If the SPS PDSCH configurations with the higher priorities correspond to the SPS PDSCH transmission, the feedback information codebook is constructed by using feedback bit information of one SPS PDSCH. If the SPS PDSCH configurations with the higher priorities do not correspond to the SPS PDSCH transmission, it is detected whether SPS PDSCH configurations with lower priorities correspond to the SPS PDSCH transmission, and if the SPS PDSCH configurations with the lower priorities correspond to the SPS PDSCH transmission, the feedback information codebook is constructed by using feedback bit information of one SPS PDSCH. If the SPS PDSCH configurations with the lower priorities do not correspond to the SPS PDSCH transmission similarly, NACK feedback bit information is fed back, for example, one NACK bit.

Specifically, it may be sequentially detected whether SPS PDSCH configurations in one slot correspond to SPS PDSCH transmission based on a DMRS.

In the embodiments of the present disclosure, for each slot, a feedback information codebook of SPS PDSCHs may be determined according to a quantity of SPS PDSCHs configured in the slot and a maximum quantity of SPS PDSCHs that a terminal device can decode in the slot, to implement feedback of a plurality of SPS PDSCHs, so that the terminal device can support feedback of the SPS PDSCHs of a plurality of services.

Feedback bit information in the feedback information codebook constructed by using the feedback bit information of the SPS PDSCHs may also be arranged in a specific order based on a construction factor. A description is made below by using some examples.

In some examples, the construction factor may include time domain and the configuration IDs of the SPS PDSCH configurations. SPS PDSCH configurations may be arranged in ascending order of the configuration IDs, and then the feedback bit information of the SPS PDSCHs may be arranged according to a time domain sequence, to obtain the feedback information codebook.

For example, SPS PDSCHs shown in FIG. 2 are used as an example. SPS PDSCH configurations are arranged in ascending order of configuration IDs as: an SPS PDSCH configuration 1 and an SPS PDSCH configuration 2. Based on ascending order of the configuration IDs of the SPS PDSCH configurations, the SPS PDSCHs are arranged according to a time domain sequence as o1, o2, o3, and o4. HARQ-ACK bits of o1, o2, o3, and o4 are $o1^{-ACK}$, $o2^{-ACK}$, $o3^{-ACK}$ and $o4^{-ACK}$ respectively. Therefore, an arrangement sequence of the feedback bit information of the SPS PDSCHs in a feedback information codebook is $o2^{-ACK}$, $o3^{-ACK}$ and $o4^{-ACK}$. If there is a dynamic scheduling PDSCH in one slot, $o1^{-ACK}$, $o2^{-ACK}$, $o3^{-ACK}$ and $o4^{-ACK}$ may be placed after feedback bit information of the dynamic scheduling PDSCH in the feedback information codebook.

In another example, SPS PDSCHs shown in FIG. 3 are used as an example. SPS PDSCH configurations are arranged in ascending order of configuration IDs as: an SPS PDSCH configuration 1 and an SPS PDSCH configuration 2. o2 and o4 at least partially overlap in time domain, and o1 and o3 do not overlap with other SPS PDSCHs in time domain. If in o2 and o4 that at least partially overlap in time domain, decoding of an SPS PDSCH of which a configuration is configured with a lower priority is discarded, that is, decoding of o4 is discarded, and a feedback information codebook is jointly constructed by using feedback bit information of an SPS PDSCH of which a configuration is configured with a higher priority, that is, feedback bit information of o2, and feedback bit information of o1 and o3 that do not overlap with other SPS PDSCHs in time domain. Based on ascending order of the configuration IDs of the SPS PDSCH configurations, the SPS PDSCHs are arranged according to the time domain sequence as o1, o2, and o3. HARQ-ACK bits of o1, o2, and o3 are $o1^{-ACK}$, $o2^{-ACK}$, and $o3^{-ACK}$ respectively. Therefore, an arrangement sequence of the feedback bit information of the SPS PDSCHs in a feedback information codebook is $o1^{-ACK}$, $o2^{-ACK}$, and $o3^{-ACK}$. If there is a dynamic scheduling PDSCH in one slot, $o1^{-ACK}$, $o2^{-ACK}$ and $o3^{-ACK}$ may be placed after feedback bit information of the dynamic scheduling PDSCH in the feedback information codebook.

In still another example, the SPS PDSCHs shown in FIG. 3 are used as an example. The SPS PDSCH configurations are arranged in ascending order of the configuration IDs as: the SPS PDSCH configuration 1 and the SPS PDSCH configuration 2. o2 and o4 at least partially overlap in time domain, and o1 and o3 do not overlap with other SPS PDSCHs in time domain. If it is determined that the feedback information codebook is constructed by using feedback bit information of all the SPS PDSCHs, based on ascending order of the configuration IDs of the SPS PDSCH configurations, the feedback bit information is arranged according to the time domain sequence, and an arrangement sequence of the feedback bit information of the SPS PDSCHs in the feedback information codebook is $o1^{-ACK}$, $o2^{-ACK}$, $o3^{-ACK}$ and $o4^{-ACK}$. If there is a dynamic scheduling PDSCH in one slot, $o1^{-ACK}$, $o2^{-ACK}$, $o3^{-ACK}$ and $o4^{-ACK}$ may be placed after feedback bit information of the dynamic scheduling PDSCH in the feedback information codebook.

In some other examples, the construction factor may include time domain and the configuration IDs of the SPS PDSCH configurations. The feedback bit information of the SPS PDSCHs may be arranged based on a time domain sequence and then in ascending order of the configuration IDs of the SPS PDSCH configurations, to obtain the feedback information codebook.

For example, SPS PDSCHs shown in FIG. 2 are used as an example. SPS PDSCH configurations are arranged in ascending order of configuration IDs as: an SPS PDSCH configuration 1 and an SPS PDSCH configuration 2. Based on the time domain sequence, the SPS PDSCHs are arranged again in ascending order of the configuration IDs of the SPS PDSCH configurations as o1, o2, o3, and o4.

HARQ-ACK bits of o1, o2, o3, and o4 are $o1^{-ACK}$, $o2^{-ACK}$, $o3^{-ACK}$, and $o4^{-ACK}$ respectively. Therefore, an arrangement sequence of the feedback bit information of the SPS PDSCHs in a feedback information codebook is $o1^{-ACK}$, $o2^{-ACK}$, $o4^{-ACK}$, and $o3^{-ACK}$. If there is a dynamic scheduling PDSCH in one slot, $o1^{-ACK}$, $o2^{-ACK}$, $o4^{-ACK}$, and $o3^{-ACK}$ may be placed after feedback bit information of the dynamic scheduling PDSCH in the feedback information codebook.

The foregoing examples may be applied to a single-carrier scenario, and in a multi-carrier scenario, processing of each carrier is the same as that of a single-carrier. In the multi-carrier scenario, the construction factor may include time domain, configuration IDs of the SPS PDSCH configurations, and a carrier identifier. The carrier identifier may be specifically a serving cell index or the like. This is not limited herein. The feedback bit information of the SPS PDSCHs in the feedback information codebook may also be arranged according to a specific sequence based on the construction factor. A description is made below by using an example in which the carrier identifier is the serving cell index.

In some examples, the construction factor includes time domain, the configuration IDs of the SPS PDSCH configurations, and the serving cell index. Based on ascending order of the configuration IDs of the SPS PDSCH configurations, the feedback bit information of the SPS PDSCHs may be sequentially arranged according to a time domain sequence and in ascending order of the serving cell indexes again, to obtain the feedback information codebook.

In some other examples, the construction factor includes time domain, the configuration IDs of the SPS PDSCH configurations, and the serving cell index. Based on a time domain sequence, the feedback bit information of the SPS PDSCHs may be sequentially arranged in ascending order of the configuration IDs of the SPS PDSCH configurations and in ascending order of the serving cell indexes again, to obtain the feedback information codebook.

In some other examples, the construction factor includes time domain, the configuration IDs of the SPS PDSCH configurations, and the serving cell index. Based on ascending order of the serving cell indexes, the feedback bit information of the SPS PDSCHs may be arranged according to a time domain sequence and in ascending order of the configuration IDs of the SPS PDSCH configurations again, to obtain the feedback information codebook.

In still some other examples, the construction factor includes time domain, the configuration IDs of the SPS PDSCH configurations, and the serving cell index. Based on ascending order of the serving cell indexes, the feedback bit information of the SPS PDSCHs may be sequentially arranged in ascending order of the configuration IDs of the SPS PDSCH configurations according to a time domain sequence, to obtain the feedback information codebook.

Figure 4:
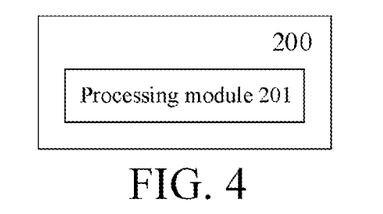
FIG. 4 is a schematic structural diagram of an embodiment of a terminal device according to a second aspect of the present disclosure.

FIG. 4 is a schematic structural diagram of an embodiment of a terminal device according to a second aspect of the present disclosure. As shown in FIG. 4, the terminal device 200 may include a processing module 201.

The processing module 201 is configured to determine, when a plurality of SPS PDSCHs are configured in one slot, a feedback information codebook of the SPS PDSCHs according to a quantity of the SPS PDSCHs configured and a capability of the terminal device.

The capability of the terminal device is used for indicating a maximum quantity N of PDSCHs that the terminal device can decode in one slot. In this embodiment of the present disclosure, there is no dynamic scheduling PDSCH in one slot.

In the embodiments of the present disclosure, for each slot, a feedback information codebook of SPS PDSCHs may be determined according to a quantity of SPS PDSCHs configured in the slot and a maximum quantity of SPS PDSCHs that a terminal device can decode in the slot, to implement feedback of a plurality of SPS PDSCHs, so that the terminal device can support feedback of the SPS PDSCHs of a plurality of services.

In some embodiments, when N is greater than 1, the processing module 201 may be configured to determine, if the quantity of SPS PDSCHs in the slot is greater than or equal to N, feedback bit information of the SPS PDSCHs in the feedback information codebook according to the capability of the terminal device.

Configurations of the SPS PDSCHs are the same or different.

In a first example, SPS PDSCHs in one slot do not overlap in time domain, and the SPS PDSCH configurations are configured with priorities. The processing module 201 may be configured to select feedback bit information of N SPS PDSCHs in descending order of the priorities of the SPS PDSCH configurations, to construct the feedback information codebook.

In a second example, SPS PDSCHs in one slot do not overlap in time domain, and the SPS PDSCH configurations are configured with priorities. The processing module 201 may be configured to detect whether the SPS PDSCH configurations correspond to SPS PDSCH transmission, and select the feedback bit information of N detected SPS PDSCHs in descending order of the priorities of the SPS PDSCH configurations, to construct the feedback information codebook.

In a third example, a plurality of SPS PDSCHs in one slot at least partially overlap in time domain, and the SPS PDSCH configurations are configured with priorities. The processing module 201 may be configured to select N SPS PDSCHs in descending order of the priorities of the SPS PDSCH configurations, and if at least two SPS PDSCHs of the selected SPS PDSCHs at least partially overlap in time domain, select the feedback bit information of the SPS PDSCH of which a configuration is configured with a higher priority in the at least two SPS PDSCHs and the feedback bit information of the SPS PDSCHs that do not overlap in time domain, to construct the feedback information codebook;

In a fourth example, a plurality of SPS PDSCHs in one slot at least partially overlap in time domain, and the SPS PDSCH configurations are configured with priorities. The processing module 201 may be configured to detect whether the SPS PDSCH configurations correspond to SPS PDSCH transmission, select N detected SPS PDSCHs in descending order of the priorities of the SPS PDSCH configurations, and if at least two SPS PDSCHs of the selected detected SPS PDSCHs at least partially overlap in time domain, select the feedback bit information of the SPS PDSCH of which a configuration is configured with a higher priority in the at least two SPS PDSCHs and the feedback bit information of the detected SPS PDSCHs that do not overlap in time domain, to construct the feedback information codebook;

In a fifth example, a plurality of SPS PDSCHs in one slot at least partially overlap in time domain, and the SPS PDSCH configurations are configured with priorities. The processing module 201 may be configured to select N SPS PDSCHs in descending order of the priorities of the SPS PDSCH configurations, and if at least two SPS PDSCHs of the selected SPS PDSCHs at least partially overlap in time domain, construct the feedback information codebook by using the feedback bit information of the N selected SPS PDSCHs.

In a sixth example, a plurality of SPS PDSCHs in one slot at least partially overlap in time domain, and the SPS PDSCH configurations are configured with priorities. The processing module 201 may be configured to detect whether the SPS PDSCH configurations correspond to SPS PDSCH transmission, select N detected SPS PDSCHs in descending order of the priorities of the SPS PDSCH configurations, and if at least two SPS PDSCHs of the selected detected SPS PDSCHs at least partially overlap in time domain, construct the feedback information codebook by using feedback bit information of the N selected detected SPS PDSCHs.

In some other embodiments, when N is greater than 1, the processing module 201 may be configured to determine, if the quantity of SPS PDSCHs in the slot is less than N, feedback bit information of the SPS PDSCHs in the feedback information codebook according to the quantity of the SPS PDSCHs configured.

Configurations of the SPS PDSCHs are the same or different.

In a first example, SPS PDSCHs in one slot do not overlap in time domain. The processing module 201 may be configured to construct the feedback information codebook by using feedback bit information of feedback information of all the SPS PDSCHs.

In a second example, SPS PDSCHs in one slot do not overlap in time domain. The processing module 201 may be configured to detect whether the SPS PDSCH configurations correspond to SPS PDSCH transmission, and construct the feedback information codebook by using the feedback bit information of the detected SPS PDSCHs.

In a third example, a plurality of SPS PDSCHs in one slot at least partially overlap in time domain, and the SPS PDSCH configurations are configured with priorities. The processing module 201 may be configured to select the feedback bit information of the SPS PDSCHs of which configurations are configured with higher priorities in the plurality of SPS PDSCHs that at least partially overlap in time domain and the feedback bit information of the SPS PDSCHs that do not overlap in time domain, to construct the feedback information codebook.

In a fourth example, a plurality of SPS PDSCHs in one slot at least partially overlap in time domain, and the SPS PDSCH configurations are configured with priorities. The processing module 201 may be configured to detect whether the SPS PDSCH configurations correspond to SPS PDSCH transmission, and select the feedback bit information of the SPS PDSCHs of which configurations are configured with higher priorities in the plurality of detected SPS PDSCHs that at least partially overlap in time domain and the feedback bit information of the detected SPS PDSCHs that do not overlap in time domain, to construct the feedback information codebook.

In a fifth example, a plurality of SPS PDSCHs in one slot at least partially overlap in time domain, and the SPS PDSCH configurations are configured with priorities. The processing module 201 may be configured to construct the feedback information codebook by using the feedback bit information of all the SPS PDSCHs.

In a sixth example, a plurality of SPS PDSCHs in one slot at least partially overlap in time domain, and the SPS PDSCH configurations are configured with priorities. The processing module 201 may be configured to detect whether the SPS PDSCH configurations correspond to SPS PDSCH transmission, and construct the feedback information codebook by using the feedback bit information of all the detected SPS PDSCHs.

In the foregoing embodiment, the processing module 201 may be further configured to detect whether all the SPS PDSCH configurations correspond to the SPS PDSCH transmission based on a DMRS; or detect whether SPS PDSCH configurations with higher priorities correspond to the SPS PDSCH transmission based on a DMRS.

In still some other embodiments, the SPS PDSCH configurations are configured with priorities. When N is equal to 1, the processing module 201 may be configured to sequentially detect whether SPS PDSCH configurations in one slot correspond to the SPS PDSCH transmission in descending order of the priorities of the SPS PDSCH configurations until the SPS PDSCH configurations correspond to the SPS PDSCH transmission in the slot, and select feedback bit information of SPS PDSCHs corresponding to the SPS PDSCH configurations to construct the feedback information codebook; and if no SPS PDSCH configurations correspond to the SPS PDSCH transmission in one slot unit, construct the feedback information codebook by using NACK feedback bit information.

In the foregoing embodiment, the processing module 201 may be further configured to sequentially detect whether the SPS PDSCH configurations correspond to the SPS PDSCH transmission based on a DMRS.

The terminal device provided in this embodiment of the present disclosure can implement each process in any method embodiment in the first aspect. To avoid repetition, details are not described herein again.

Figure 5:
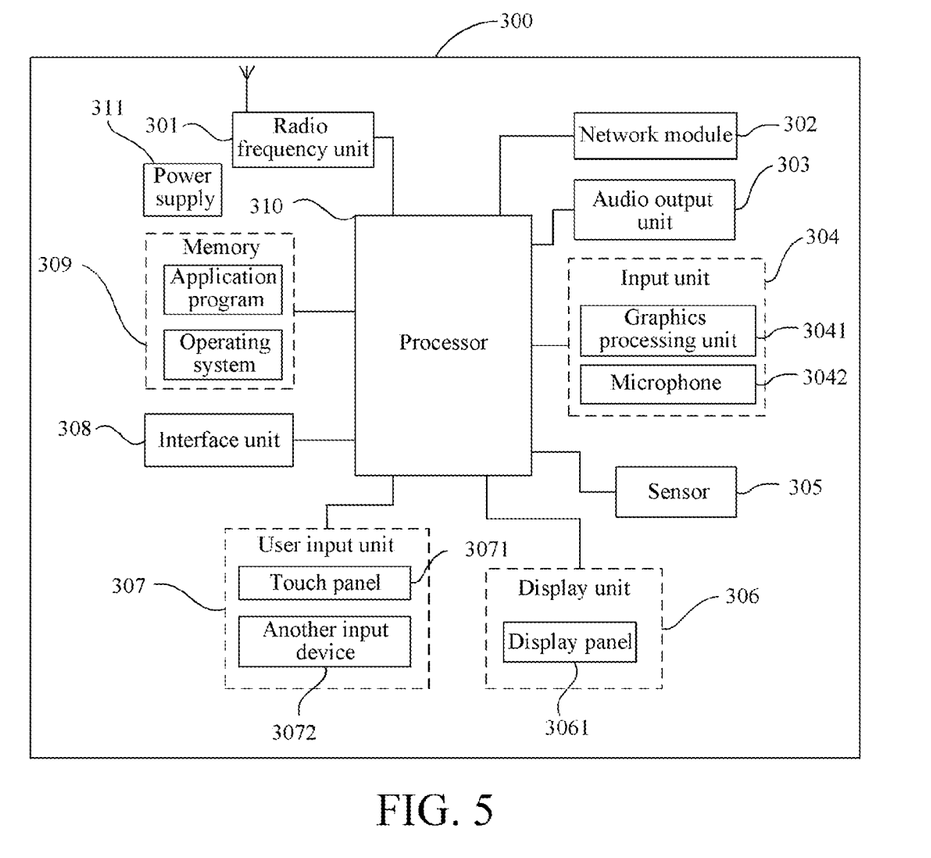
FIG. 5 is a schematic diagram of a hardware structure of an embodiment of a terminal device according to a third aspect of the present disclosure.

FIG. 5 is a schematic diagram of a hardware structure of an embodiment of a terminal device according to a third aspect of the present disclosure. As shown in FIG. 5, the terminal device 300 includes, but is not limited to: components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the structure of the terminal device shown in FIG. 5 does not constitute a limitation to the terminal device, and the terminal device may include more or fewer components than those shown in the figure, or some components may be combined, or different component deployments may be used. In this embodiment of the present disclosure, the terminal device includes, but is not limited to, a smartphone, a tablet computer, a notebook computer, a palmtop computer, a vehicle terminal, a wearable device, a pedometer, and the like.

The processor 310 is configured to determine, when a plurality of SPS PDSCHs are configured in one slot, a feedback information codebook of the SPS PDSCHs according to a quantity of the SPS PDSCHs configured and a capability of the terminal device.

The capability of the terminal device is used for indicating a maximum quantity N of PDSCHs that the terminal device can decode in one slot. In this embodiment of the present disclosure, there is no dynamic scheduling PDSCH in one slot.

In the embodiments of the present disclosure, for each slot, a feedback information codebook of SPS PDSCHs may be determined according to a quantity of SPS PDSCHs configured in the slot and a maximum quantity of SPS PDSCHs that a terminal device can decode in the slot, to implement feedback of a plurality of SPS PDSCHs, so that the terminal device can support feedback of the SPS PDSCHs of a plurality of services.

It should be understood that in this embodiment of the present disclosure, the radio frequency unit 301 may be configured to receive and transmit information or receive and transmit a signal during a call. Specifically, the radio frequency unit may receive downlink data from a base station for processing by the processor 310, and send uplink data to the base station. Generally, the radio frequency unit 301 includes, but is not limited to, an antenna, at least one amplifier, a transceiver, a coupler, a low noise amplifier, a duplexer, and the like. In addition, the radio frequency unit 301 may further communicate with a network device and another device through a wireless communication system.

The terminal device provides wireless broadband Internet access for a user through the network module 302, for example, help the user receive or send an email, browse a web page, and access a streaming media.

The audio output unit 303 may convert audio data received by the radio frequency unit 301 or the network module 302 or stored in the memory 309 into an audio signal and output the audio signal as a sound. Moreover, the audio output unit 303 may further provide an audio output (such as call signal receiving sound or message receiving sound) related to a specific function executed by the terminal device 300. The audio output unit 303 includes a loudspeaker, a buzzer, a telephone receiver, and the like.

The input unit 304 is configured to receive an audio signal or a video signal. The input unit 304 may include a graphics processing unit (GPU) 3041 and a microphone 3042. The GPU 3041 processes image data of a static picture or a video that is obtained by an image acquisition apparatus (for example, a camera) in a video acquisition mode or an image acquisition mode. An image frame that has been processed may be displayed on the display unit 306. The image frame that has been processed by the GPU 3041 may be stored in the memory 309 (or another storage medium) or sent by using the radio frequency unit 301 or the network module 302. The microphone 3042 may receive a sound and can process the sound into audio data. The processed audio data may be converted, in a phone talk mode, into a format that may be sent to a mobile communication base station via the radio frequency unit 301 and be output.

The terminal device 300 further includes at least one sensor 305, for example, a light sensor, a motion sensor, or another sensor. Specifically, the optical sensor includes an ambient light sensor and a proximity sensor, where the ambient light sensor may adjust luminance of a display panel 3061 according to luminance of ambient light, and the proximity sensor may switch off the display panel 3061 and/or backlight when the terminal device 300 is moved to the ear. As one type of motion sensor, an accelerometer sensor may detect magnitude of accelerations at various directions (which generally are triaxial), may detect magnitude and a direction of the gravity when static, and may be configured to identify a terminal device gesture (such as switchover between horizontal and vertical screens, a related game, and gesture calibration of a magnetometer), a related function of vibration identification (such as a pedometer and a knock). The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information entered by a user or information provided to a user. The display unit 306 may include the display panel 3061. The display panel 3061 may be configured in the form of a liquid crystal display (LCD), an organic light-emitting diode (OLED), or the like.

The user input unit 307 may be configured to: receive input digit or character information, and generate a keyboard signal input related to a user setting and function control of the terminal device. Specifically, the user input unit 307 includes a touch panel 3071 and another input device 3072. The touch panel 3071, also referred to as a touchscreen, may collect a touch operation of a user on or near the touch panel (such as an operation of a user on or near the touch panel 3071 by using any suitable object or attachment such as a finger or a touch pen). The touch panel 3071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 310, and receives and executes a command transmitted by the processor 310. In addition, the touch panel 3071 may be implemented by using various types such as a resistive type, a capacitive type, an infrared type, and a surface acoustic wave type. In addition to the touch panel 3071, the user input unit 307 may further include another input device 3072. Specifically, the another input device 3072 may include, but not limited to, a physical keyboard, a functional key (for example, a volume control key or a switch key), a track ball, a mouse, and a joystick. Details are not described herein again.

Further, the touch panel 3071 may cover the display panel 3061. After detecting a touch operation on or near the touch panel, the touch panel 3071 transfers the touch operation to the processor 310, so as to determine a type of a touch event. Then, the processor 310 provides a corresponding visual output on the display panel 3061 according to the type of the touch event. In FIG. 5, the touch panel 3071 and the display panel 3061 implement, as two independent parts, input and output functions of the terminal device. However, in some embodiments, the touch panel 3071 and the display panel 3061 may be integrated to implement the input and output functions of the terminal device. This is not specifically limited herein.

The interface unit 308 is used as an interface through which an external apparatus and the terminal device 300 are connected. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 308 may be configured to receive an input (for example, data information or power) from an external apparatus, and transmit the received input to one or more elements in the terminal device 300, or may be configured to transmit data between the terminal device 300 and the external apparatus.

The memory 309 may be configured to store a software program and various data. The memory 309 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 309 may include a high-speed random access memory (RAM), and may further include a nonvolatile memory such as at least one magnetic disk storage device, a flash memory, or another volatile solid-state storage device.

The processor 310 is a control center of the terminal device, and is connected to various parts of the terminal device by using various interfaces and lines. By running or executing the software program and/or module stored in the memory 309, and invoking data stored in the memory 309, the processor performs various functions and data processing of the terminal device, thereby performing overall monitoring on the terminal device. The processor 310 may include one or more processing units. Preferentially, the processor 310 may integrate an application processor and a modem processor. The application processor mainly processes an operating system, a user interface, an application program, and the like. The modem processor mainly processes wireless communication. It may be understood that the foregoing modem processor may either not be integrated into the processor 310.

The terminal device 300 may further include the power supply 311 (for example, a battery) for supplying power to the components. Preferably, the power supply 311 may be logically connected to the processor 310 by using a power management system, thereby implementing functions such as charging, discharging, and power consumption management by using the power management system.

In addition, the terminal device 300 includes some function modules that are not shown. Details are not described herein again.

Optionally, an embodiment of the present disclosure further provides a terminal device, including a processor 310, a memory 309, and a computer program stored on the memory 309 and executable by the processor 310, where the computer program, when executed by the processor 310, implements each process of the embodiment of the feedback method for an SPS PDSCH and can achieve a same technical effect. To avoid repetition, details are not described herein.

An embodiment of the present disclosure further provides a computer-readable storage medium, storing a computer program, where the computer program, when executed by a processor, implements each process of any embodiment of the feedback method for an SPS PDSCH applicable to the terminal device and can achieve a same technical effect. To avoid repetition, details are not described herein. The computer-readable storage medium may include, a read-only memory (ROM), a RAM, a magnetic disk, an optical disk, or the like.

The embodiments of this specification are all described in a progressive manner, for same or similar parts in the embodiments, refer to such embodiments, and descriptions of each embodiment focus on a difference from other embodiments. For the terminal device embodiment, the network device embodiment, and the computer-readable storage medium embodiment, for related parts, reference may be made to partial descriptions in the method embodiment.

It should be noted that, the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of the present disclosure essentially or the part contributing to the related art may be implemented in the form of a software product. The computer software product is stored in a storage medium (such as a ROM/RAM, a magnetic disk, or an optical disc), and includes several instructions for instructing a terminal (which may be a mobile phone, a computer, a server, a network device, or the like) to perform the method described in the embodiments of the present disclosure.

Aspects of the present disclosure are described herein with reference to flowchart and/or block diagrams of methods, apparatuses (systems), and machine program products according to the embodiments of the present disclosure. It should be understood that each block in flowcharts and/or block diagrams and a combination of blocks in the flowchart and/or the block diagram can be implemented by using a program or an instruction. These programs or instructions may be provided to a processor of a general purpose computer, special purpose computer, or other programmable data processing apparatus to produce a machine, such that the programs or the instructions, which execute via the processor of the computer or other programmable data processing apparatus, implement the functions/acts specified in one or more blocks in the flowcharts and/or in the block diagrams. The processor may be, but is not limited to, a general purpose processor, a dedicated processor, a special application processor, or a field-programmable logic circuit. It may be further understood that each block in the block diagrams and/or the flowcharts and a combination of blocks in the block diagrams and/or the flowcharts may alternatively be implemented by special-purpose hardware performing specified functions or acts or may be implemented by combinations of special-purpose hardware and computer instructions.

The embodiments of the present disclosure are described above with reference to the accompanying drawings. However, the present disclosure is not limited to the foregoing specific implementations, and the foregoing specific implementations are merely exemplary, but not limited. A plurality of forms may be further made by a person of ordinary skill in the art in enlightenment of the present disclosure without depart from the purpose of the present disclosure and the protection scope of the claims and all fall within the protection scope of the present disclosure.

What is claimed is:

1. A feedback method for a semi-persistent scheduling (SPS) physical downlink shared channel (PDSCH), applicable to a terminal device, the method comprising:
   determining, when a plurality of SPS PDSCHs are configured in one slot, a feedback information codebook of the SPS PDSCHs according to a quantity of the SPS PDSCHs configured by a network device
   the determining a feedback information codebook of the SPS PDSCHs according to a quantity of the SPS PDSCH configured by the network device comprises:
   when at least two SPS PDSCHs of the plurality of SPS PDSCHs in the slot overlap in time domain, and the SPS PDSCH configurations are configured with priorities, selecting feedback bit information of SPS PDSCHs of which configurations are configured with higher priorities of the at least two SPS PDSCHs, and feedback bit information of SPS PDSCHs that do not overlap in time domain, to construct the feedback information codebook of the plurality of SPS PDSCHs.

2. The method according to claim 1, wherein the determining a feedback information codebook of the SPS PDSCHs according to a quantity of the SPS PDSCHs configured by the network device comprises:
   determining a feedback information codebook of the SPS PDSCHs according to a quantity of the SPS PDSCHs configured by the network device and a capability of the terminal device, wherein
   the capability of the terminal device is used for indicating a maximum quantity N of PDSCHs that the terminal device can decode in one slot.

3. The method according to claim 2, wherein when N is greater than 1,
   the determining a feedback information codebook of the SPS PDSCHs according to a quantity of the SPS PDSCHs configured by the network device and a capability of the terminal device comprises:
   if the quantity of SPS PDSCHs in the slot is greater than or equal to N, determining feedback bit information of the SPS PDSCHs in the feedback information codebook according to the capability of the terminal device, wherein
   configurations of the SPS PDSCHs are the same or different.

4. The method according to claim 3, wherein the SPS PDSCHs in the slot do not overlap in time domain, and the SPS PDSCH configurations are configured with priorities; and
   the determining feedback bit information of the SPS PDSCHs in the feedback information codebook according to the capability of the terminal device comprises:
   selecting the feedback bit information of N SPS PDSCHs in descending order of the priorities of the SPS PDSCH configurations, to construct the feedback information codebook;
   or
   detecting whether the SPS PDSCH configurations correspond to SPS PDSCH transmission, and selecting the feedback bit information of N detected SPS PDSCHs in descending order of the priorities of the SPS PDSCH configurations, to construct the feedback information codebook-, or
   wherein a plurality of SPS PDSCHs in the slot at least partially overlap in time domain, and the SPS PDSCH configurations are configured with priorities; and the determining feedback bit information of the SPS PDSCHs in the feedback information codebook according to the capability of the terminal device comprises:
selecting N SPS PDSCHs in descending order of the priorities of the SPS PDSCH configurations, and if at least two SPS PDSCHs of the selected SPS PDSCHs at least partially overlap in time domain, selecting the feedback bit information of the SPS PDSCH of which a configuration is configured with a higher priority in the at least two SPS PDSCHs and the feedback bit information of the SPS PDSCHs that do not overlap in time domain, to construct the feedback information codebook;
or
detecting whether the SPS PDSCH configurations correspond to SPS PDSCH transmission, selecting N detected SPS PDSCHs in descending order of the priorities of the SPS PDSCH configurations, and if at least two SPS PDSCHs of the selected detected SPS PDSCHs at least partially overlap in time domain, selecting the feedback bit information of the SPS PDSCH of which a configuration is configured with a higher priority in the at least two SPS PDSCHs and the feedback bit information of the detected SPS PDSCHs that do not overlap in time domain, to construct the feedback information codebook;
or
selecting N SPS PDSCHs in descending order of the priorities of the SPS PDSCH configurations, and if at least two SPS PDSCHs of the selected SPS PDSCHs at least partially overlap in time domain, constructing the feedback information codebook by using the feedback bit information of the N selected SPS PDSCHS;
or
detecting whether the SPS PDSCH configurations correspond to SPS PDSCH transmission, selecting N detected SPS PDSCHs in descending order of the priorities of the SPS PDSCH configurations, and if at least two SPS PDSCHs of the selected detected SPS PDSCHs at least partially overlap in time domain, constructing the feedback information codebook by using the feedback bit information of the N selected detected SPS PDSCHs.

5. The method according to claim 4, wherein the detecting whether the SPS PDSCH configurations correspond to SPS PDSCH transmission comprises:
detecting whether all the SPS PDSCH configurations correspond to the SPS PDSCH transmission based on a demodulation reference signal (DMRS);
or
detecting the SPS PDSCH configurations with higher priorities correspond to the SPS PDSCH transmission based on a DMRS.

6. The method according to claim 2, wherein when N is greater than 1,
the determining a feedback information codebook of the SPS PDSCHs according to a quantity of the SPS PDSCHs configured by the network device and a capability of the terminal device comprises:
if the quantity of SPS PDSCHs in the slot is less than N, determining feedback bit information of the SPS PDSCHs in the feedback information codebook according to the quantity of the SPS PDSCHs configured by the network device, wherein configurations of the SPS PDSCHs are the same or different.

7. The method according to claim 6, wherein the SPS PDSCHs in the slot do not overlap in time domain; and
the determining feedback bit information of the SPS PDSCHs in the feedback information codebook according to the quantity of the SPS PDSCH configured by the network device comprises:
constructing the feedback information codebook by using the feedback bit information of feedback information of all the SPS PDSCHs;
or
detecting whether the SPS PDSCH configurations correspond to SPS PDSCH transmission, and constructing the feedback information codebook by using the feedback bit information of the detected SPS PDSCHs.

8. The method according to claim 6, wherein a plurality of SPS PDSCHs in the slot at least partially overlap in time domain, and the SPS PDSCH configurations are configured with priorities; and
the determining feedback bit information of the SPS PDSCHs in the feedback information codebook according to the quantity of the SPS PDSCH configured by the network device comprises:
detecting whether the SPS PDSCH configurations correspond to SPS PDSCH transmission, and selecting the feedback bit information of the SPS PDSCHs of which configurations are configured with higher priorities in the plurality of detected SPS PDSCHs that at least partially overlap in time domain and the feedback bit information of the detected SPS PDSCHs that do not overlap in time domain, to construct the feedback information codebook;
or
constructing the feedback information codebook by using the feedback bit information of all the SPS PDSCHs;
or
detecting whether the SPS PDSCH configurations correspond to SPS PDSCH transmission, and constructing the feedback information codebook by using the feedback bit information of all the detected SPS PDSCHs.

9. The method according to claim 2, wherein SPS PDSCH configurations are configured with priorities, and when N is equal to 1,
the determining a feedback information codebook of the SPS PDSCHs according to a quantity of the SPS PDSCHs configured by the network device and a capability of the terminal device comprises:
sequentially detecting whether the SPS PDSCH configurations correspond to SPS PDSCH transmission in descending order of the priorities of the SPS PDSCH configurations until an SPS PDSCH configuration in the slot correspond to the SPS PDSCH transmission, and selecting feedback bit information of an SPS PDSCH corresponding to the SPS PDSCH configuration, to construct the feedback information codebook; and
if no SPS PDSCH configurations correspond to the SPS PDSCH transmission, constructing the feedback information codebook by using non-acknowledgement feedback bit information.

10. The method according to claim 9, wherein the sequentially detecting whether the SPS PDSCH configurations correspond to SPS PDSCH transmission comprises:
sequentially detecting whether the SPS PDSCH configurations correspond to SPS PDSCH transmission based on a demodulation reference signal (DMRS).

11. A terminal device, comprising a processor, a memory, and a computer program stored on the memory and executable on the processor, wherein the computer program, when executed by the processor, implements the following steps:
  determining, when a plurality of SPS PDSCHs are configured in one slot, a feedback information codebook of the SPS PDSCHs according to a quantity of the SPS PDSCHs configured by a network device
  the determining a feedback information codebook of the SPS PDSCHs according to a quantity of the SPS PDSCH configured by the network device comprises:
  when at least two SPS PDSCHs of the plurality of SPS PDSCHs in the slot overlap in time domain, and the SPS PDSCH configurations are configured with priorities, selecting feedback bit information of SPS PDSCHs of which configurations are configured with higher priorities of the at least two SPS PDSCHs, and feedback bit information of SPS PDSCHs that do not overlap in time domain, to construct the feedback information codebook of the plurality of SPS PDSCHs.

12. The terminal device according to claim 11, wherein the determining a feedback information codebook of the SPS PDSCHs according to a quantity of the SPS PDSCHs configured by the network device comprises:
  determining a feedback information codebook of the SPS PDSCHs according to a quantity of the SPS PDSCHs configured by the network device and a capability of the terminal device, wherein
  the capability of the terminal device is used for indicating a maximum quantity N of PDSCHs that the terminal device can decode in one slot.

13. The terminal device according to claim 12, wherein when N is greater than 1,
  the determining a feedback information codebook of the SPS PDSCHs according to a quantity of the SPS PDSCHs configured by the network device and a capability of the terminal device comprises:
  if the quantity of SPS PDSCHs in the slot is greater than or equal to N, determining feedback bit information of the SPS PDSCHs in the feedback information codebook according to the capability of the terminal device, wherein
  configurations of the SPS PDSCHs are the same or different.

14. The terminal device according to claim 13, wherein the SPS PDSCHs in the slot do not overlap in time domain, and the SPS PDSCH configurations are configured with priorities; and
  the determining feedback bit information of the SPS PDSCHs in the feedback information codebook according to the capability of the terminal device comprises:
  selecting the feedback bit information of N SPS PDSCHs in descending order of the priorities of the SPS PDSCH configurations, to construct the feedback information codebook;
  or
  detecting whether the SPS PDSCH configurations correspond to SPS PDSCH transmission, and selecting the feedback bit information of N detected SPS PDSCHs in descending order of the priorities of the SPS PDSCH configurations, to construct the feedback information codebook-, or
  wherein a plurality of SPS PDSCHs in the slot at least partially overlap in time domain, and the SPS PDSCH configurations are configured with priorities; and
  the determining feedback bit information of the SPS PDSCHs in the feedback information codebook according to the capability of the terminal device comprises:
  selecting N SPS PDSCHs in descending order of the priorities of the SPS PDSCH configurations, and if at least two SPS PDSCHs of the selected SPS PDSCHs at least partially overlap in time domain, selecting the feedback bit information of the SPS PDSCH of which a configuration is configured with a higher priority in the at least two SPS PDSCHs and the feedback bit information of the SPS PDSCHs that do not overlap in time domain, to construct the feedback information codebook;
  or
  detecting whether the SPS PDSCH configurations correspond to SPS PDSCH transmission, selecting N detected SPS PDSCHs in descending order of the priorities of the SPS PDSCH configurations, and if at least two SPS PDSCHs of the selected detected SPS PDSCHs at least partially overlap in time domain, selecting the feedback bit information of the SPS PDSCH of which a configuration is configured with a higher priority in the at least two SPS PDSCHs and the feedback bit information of the detected SPS PDSCHs that do not overlap in time domain, to construct the feedback information codebook;
  or
  selecting N SPS PDSCHs in descending order of the priorities of the SPS PDSCH configurations, and if at least two SPS PDSCHs of the selected SPS PDSCHs at least partially overlap in time domain, constructing the feedback information codebook by using the feedback bit information of the N selected SPS PDSCHS;
  or
  detecting whether the SPS PDSCH configurations correspond to SPS PDSCH transmission, selecting N detected SPS PDSCHs in descending order of the priorities of the SPS PDSCH configurations, and if at least two SPS PDSCHs of the selected detected SPS PDSCHs at least partially overlap in time domain, constructing the feedback information codebook by using the feedback bit information of the N selected detected SPS PDSCHs.

15. The terminal device according to claim 14, wherein the detecting whether the SPS PDSCH configurations correspond to SPS PDSCH transmission comprises:
  detecting whether all the SPS PDSCH configurations correspond to the SPS PDSCH transmission based on a demodulation reference signal (DMRS);
  or
  detecting the SPS PDSCH configurations with higher priorities correspond to the SPS PDSCH transmission based on a DMRS.

16. The terminal device according to claim 12, wherein when N is greater than 1,
  the determining a feedback information codebook of the SPS PDSCHs according to a quantity of the SPS PDSCHs configured by the network device and a capability of the terminal device comprises:
  if the quantity of SPS PDSCHs in the slot is less than N, determining feedback bit information of the SPS PDSCHs in the feedback information codebook according to the quantity of the SPS PDSCHs configured by the network device, wherein
  configurations of the SPS PDSCHs are the same or different.

17. The terminal device according to claim 16, wherein the SPS PDSCHs in the slot do not overlap in time domain; and the determining feedback bit information of the SPS PDSCHs in the feedback information codebook according to the quantity of the SPS PDSCH configured by the network device comprises:

constructing the feedback information codebook by using the feedback bit information of feedback information of all the SPS PDSCHs;

or detecting whether the SPS PDSCH configurations correspond to SPS PDSCH transmission, and constructing the feedback information codebook by using the feedback bit information of the detected SPS PDSCHs.

18. The terminal device according to claim 12, wherein SPS PDSCH configurations are configured with priorities, and when N is equal to 1, the determining a feedback information codebook of the SPS PDSCHs according to a quantity of the SPS PDSCHs configured by the network device and a capability of the terminal device comprises:

sequentially detecting whether the SPS PDSCH configurations correspond to SPS PDSCH transmission in descending order of the priorities of the SPS PDSCH configurations until an SPS PDSCH configuration in the slot correspond to the SPS PDSCH transmission, and selecting feedback bit information of an SPS PDSCH corresponding to the SPS PDSCH configuration, to construct the feedback information codebook; and if no SPS PDSCH configurations correspond to the SPS PDSCH transmission, constructing the feedback information codebook by using non-acknowledgement feedback bit information.

19. The terminal device according to claim 16, wherein a plurality of SPS PDSCHs in the slot at least partially overlap in time domain, and the SPS PDSCH configurations are configured with priorities; and the determining feedback bit information of the SPS PDSCHs in the feedback information codebook according to the quantity of the SPS PDSCH configured by the network device comprises:

detecting whether the SPS PDSCH configurations correspond to SPS PDSCH transmission, and selecting the feedback bit information of the SPS PDSCHs of which configurations are configured with higher priorities in the plurality of detected SPS PDSCHs that at least partially overlap in time domain and the feedback bit information of the detected SPS PDSCHs that do not overlap in time domain, to construct the feedback information codebook;

or constructing the feedback information codebook by using the feedback bit information of all the SPS PDSCHs;

or detecting whether the SPS PDSCH configurations correspond to SPS PDSCH transmission, and constructing the feedback information codebook by using the feedback bit information of all the detected SPS PDSCHs.

20. A computer-readable storage medium, storing a computer program, wherein the computer program, when executed by a processor, implements the following steps:

determining, when a plurality of SPS PDSCHs are configured in one slot, a feedback information codebook of the SPS PDSCHs according to a quantity of the SPS PDSCHs configured by a network device, wherein the determining a feedback information codebook of the SPS PDSCHs according to a quantity of the SPS PDSCH configured by the network device comprises:

when at least two SPS PDSCHs of the plurality of SPS PDSCHs in the slot overlap in time domain, and the SPS PDSCH configurations are configured with priorities, selecting feedback bit information of SPS PDSCHs of which configurations are configured with higher priorities of the at least two SPS PDSCHs, and feedback bit information of SPS PDSCHs that do not overlap in time domain, to construct the feedback information codebook of the plurality of SPS PDSCHs.

* * * * *